Oct. 26, 1971    F. J. HRUBY    3,615,014
METHOD OF AND APPARATUS FOR SOLID WASTE RECOVERY
Filed Jan. 21, 1970    2 Sheets-Sheet 1

INVENTOR.
FRANK J. HRUBY
BY Watts, Hoffmann,
Fisher & Heinke
ATTORNEYS.

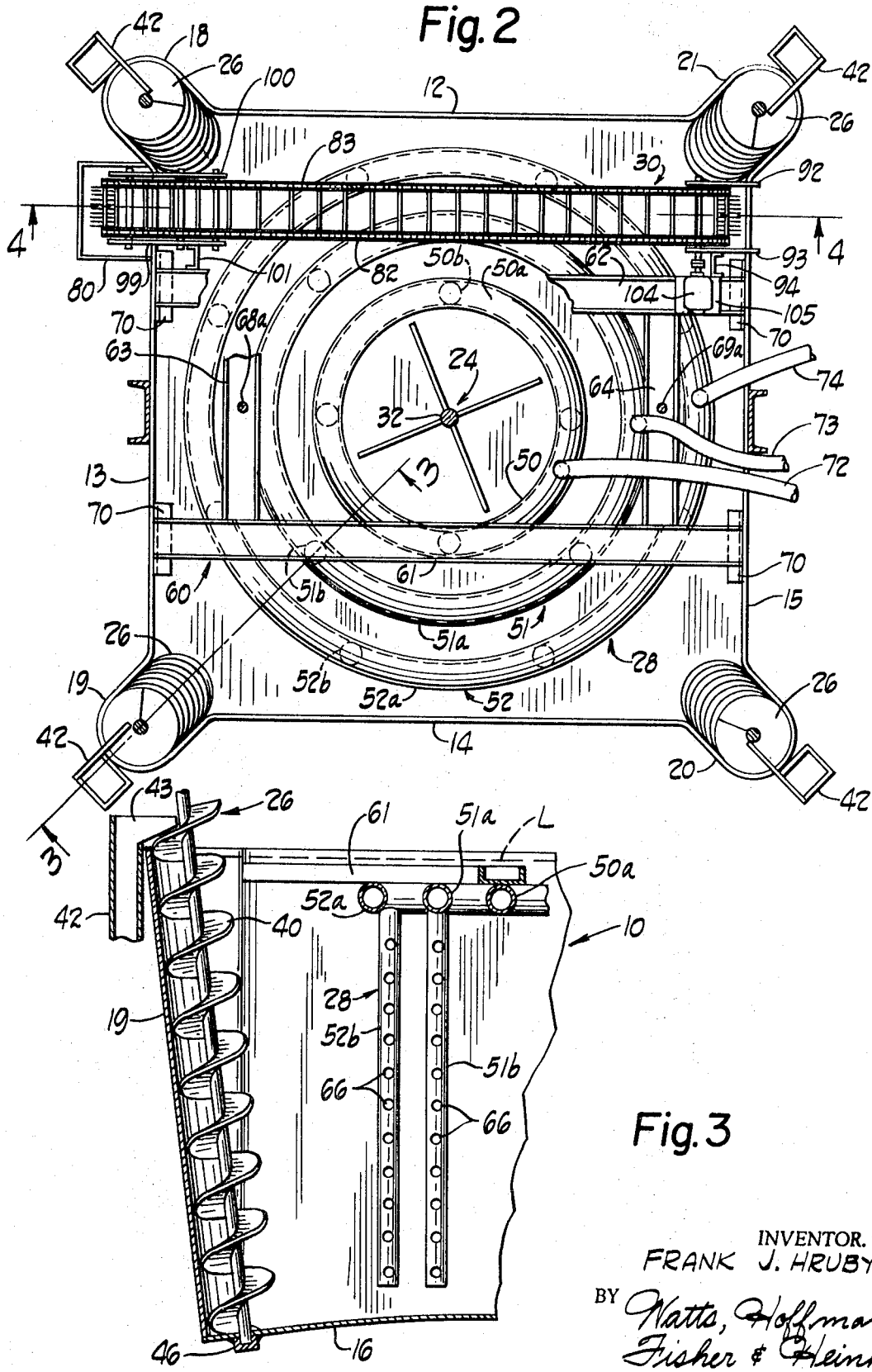

United States Patent Office

3,615,014
Patented Oct. 26, 1971

3,615,014
METHOD OF AND APPARATUS FOR SOLID WASTE RECOVERY
Frank J. Hruby, 2809 County Road 18, Ravenna, Ohio 44266
Filed Jan. 21, 1970, Ser. No. 4,690
Int. Cl. B04b 5/12
U.S. Cl. 209—211                                17 Claims

ABSTRACT OF THE DISCLOSURE

Solid waste, especially household scrap, is separated into component substances on the basis of their relative densities by entraining the waste in a liquid and swirling the liquid and waste in a vessel having a peripheral side wall with one or more corner portions. The heaviest component substances are collected in the corner portions of the vessel and other solid waste still entrained in the liquid is removed at locations inwardly of the side wall. In a preferred embodiment, a rotor is located centrally of a square vessel to swirl liquid and waste. Collecting members, preferably of a conveyor type, are located in the corner portions of the vessel to collect and remove the heavier waste and suction conduits are inserted into the vessel inwardly of the side wall at particular radial distances from the center of the vessel to remove entrained waste of different densities. The vessel is provided with an upwardly convex bottom wall and a skimmer at the top for removing floating waste.

FIELD OF THE INVENTION

This invention relates to the treatment of solid waste, more particularly to methods of and apparatus for separating household scrap into components or groups of components.

BACKGROUND AND SUMMARY

A critical problem exists in the disposal of waste products because the amount of waste products and the cost of disposal is ever increasing. This is especially true of household scrap (i.e., household waste excluding table scrap) and is due not only to the population increase but also to the widespread marketing of products in individual packages and throw away containers.

One familiar and customary manner of disposing of household scrap is dumping, to provide land fill. This becomes increasingly more expensive as suitable dumping areas become further removed from population centers and is generally wasteful of much scrap which could be reused if it could be economically recovered.

In accordance with the present invention, methods and apparatus have been provided for separating solid waste, especially household scrap, into various component groups for recovery. The method is economical to practice and the apparatus can be produced relatively inexpensively. Through the use of this method and apparatus, scrap which has heretofore been discarded can be recovered and be used or sold. This productive use or sale significantly reduces the cost of waste disposal and eliminates the wasteful discarding of much useful material. In some instances, depending upon scrap content, the value of recovered scrap may be greater than the cost of collecting and treating the scrap.

In principle, solid waste of various component parts is entrained in a swirling liquid carrier within a vessel causing portions of the waste to gravitate radially toward the wall of the vessel. Different waste components move outward at different rates and, hence, to different extends in any given time in accordance with the different densities of the components. As as consequence, the component parts become substantially stratified into concentric zones, with the heaviest waste components closed to the peripheral wall of the vessel. As the heaviest component parts move outward and into corner portions of the vessel they settle from the liquid due to the lower velocity of the liquid in the corner portions and are collected and removed. Other component parts of the waste are removed with entraining liquid at particular radial distances from the center of the vessel where they have concentrated at a particular time due to their similar density.

Apparatus embodying the present invention includes a cornered vessel for containing solid waste and entraining liquid, and a rotor for swirling the liquid. An upright peripheral side wall in part forming the vessel is provided with one or more, preferably four, corner portions in which entrained solid waste can settle. Horizontal collecting members are located in each corner portion and carry collected waste from the vessel. Vertical suction conduits are supported in one or more circular arrangements for movement vertically into the vessel inwardly of the side wall at predetermined radial distances from the center to remove waste components of lesser density than those collected in the corner portions. Preferably, the vessel has a closed bottom of an upwardly convex shape. Solid waste and fluid is introduced in batches into the vessel, processed, and removed. Alternatively, a discharge can be provided in the bottom of the vessel and a continuous flow of liquid can be passed through the vessel while entrained solid waste is segregated and in part removed. A skimmer located at the liquid level removes floating waste components.

Typically, solid waste of the household scrap type will have most of any ferro-magnetic metallic components removed prior to the treatment contemplated herein because of the convenience of magnetic separation for such scrap components, although it is not necessary that such components be separated. Preferably, the waste is preground before separation so that the waste components consist mainly of relatively small particles for ease of treatment and especially case of entrainment. This is more desirable with smaller treatment vessels than with larger vessels because the objects comprising the waste are small in their original state relative to a large treatment vessel. It further assures that hollow containers will be broken and entrained throughout the carrying liquid rather than float on the surface thereof.

The above and other features and advantages of this invention will become more apparent as the invention becomes better understood by reference to the detailed description that follows, when considered in connection with the accompanying drawings.

BRIEF DESCRIPTION OF THE DRAWINGS

FIG. 2 is a top plan view, with parts removed, of the apparatus of FIG. 1 as viewed approximately from the plane indicated by the line 2—2;

FIG. 3 is a partial transverse sectional view of the apparatus of FIG. 2, taken along the line 3—3 and looking in the direction of the arrows.

DETAILED DECRIPTION OF THE INVENTION

Figure 1:
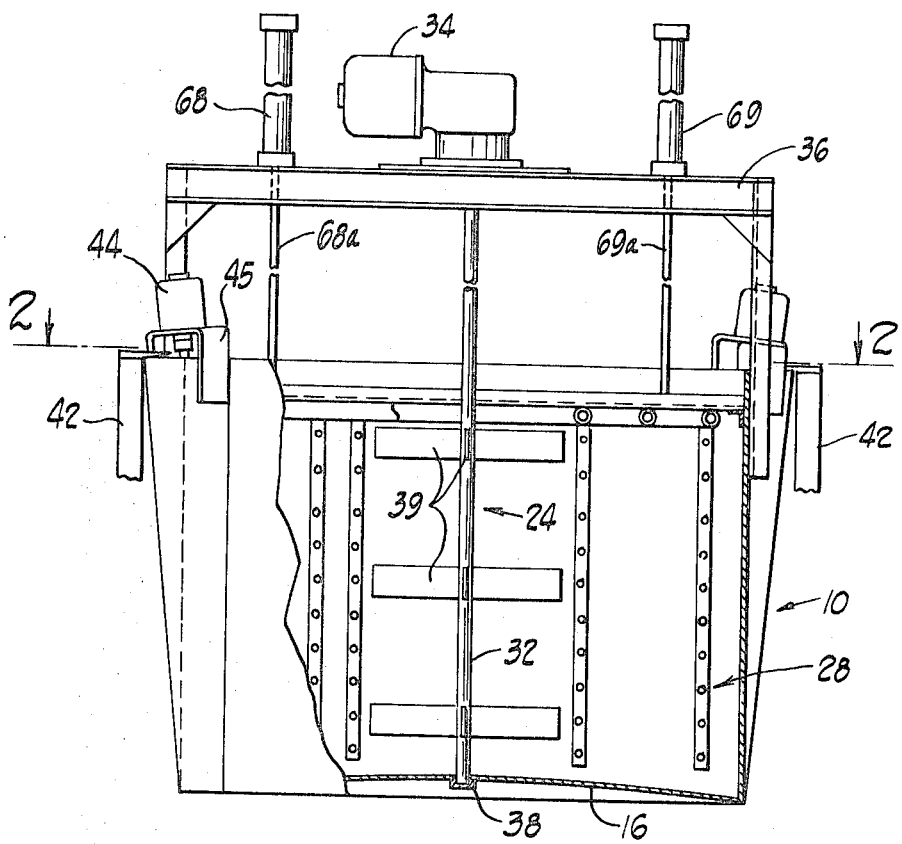
FIG. 1 is a front elevational view, with parts in section, of apparatus embodying the present invention and for separating waste products in accordance with the method of the present invention.

With reference to the drawings, a large vessel 10 is shown for containing solid waste and an entraining liquid in which the solid waste is separated into various components or groups of components, according to the relative density thereof. As best shown in FIG. 2, the vessel 10 of the preferred embodiment is substantially square in plan, having four planar side wall portions 12, 13, 14, 15, of a substantial depth, preferably about equal to the width, and has a bottom wall 16 that is curved convexly upward in a shallow dome shape. The vessel is typically uncovered. In the preferred embodiment shown, there are four corner portions 18, 19, 20, 21 at the junctures of the side walls 12–15 and equally distant from the center of the vessel. The side walls 12–15 are vertical, but in the preferred embodiment the corner portions 18–21 are inclined outward in an upward direction to accommodate conveying means and to facilitate removal of collected solid waste, as will be explained in more detail subsequently. Mechanisms associated with the vessel 10 are provided for separating scrap into component parts or groups of component parts of similar density. These mechanisms include a central rotor 24, corner collectors 26 associated with each corner portion 18–21, suction conduits 28 and a surface skimmer 30.

The central rotor 24 is used to swirl entraining liquid and scrap contents within the vessel 10 and thereby cause the scrap to gravitate radially outward from the rotor 24. The rotor includes a vertical shaft 32 that depends from a transmission and electric motor unit 34 that is secured to a superstructure 36 on the vessel 10. The lower end of the shaft 32 is received in a bearing support 38 at the center of the bottom wall 16. A plurality of flat paddle blades 39 extend perpendicularly from the shaft 32. The blades extend a short distance from the shaft, relative to the cross sectional dimension of the vessel 10, being sufficiently large to move the entraining liquid and scrap in a swirling motion within the vessel without extending so far as to interfere with the suction conduits 28 or to disrupt the stratification of the waste components as they migrate radially from the rotor toward the peripheral walls of the vessel. As shown, the blades preferably act at spaced locations through the height of the vessel. The particular construction and arrangement of the blades is not critical.

Corner collectors 26 provide generally horizontal surface portions along the corner portions, vertically of the vessel 10, and provide in effect a series of shelf-like surfaces. The surfaces can be moved upward or are capable of moving collected scrap upward. In the embodiment shown, the collectors are in the form of screws or augers 40. Heavier scrap components that reach the periphery of the vessel 10 settle on the generally horizontal surfaces of the collectors for removal from the vessel. Screws 40 of the preferred embodiment are recessed in the corner portions 18–21 and are inclined outward in an upward direction to facilitate removal of collected scrap at the top of the vessel. Scrap collects on turns of each screw and rotation of the screws lift the collected scrap by virtue of the resistance to rotary movement of the scrap provided by the liquid in the vessel. As a result, when the screw rotates, the collected scrap moves up the screw where it is collected in a chute 42 associated with each corner portion 18–21. Each chute 42 has a baffle portion 43 that extends radially inward from the chute, closely adjacent to the blade of the associated screw 40. The screw extends above the liquid level in the vessel and when collected scrap advances on the screw to a height above the liquid level it is then moved in rotation with the screw and scraped from the blade by the baffle portion 43 and falls into the chute 42, from which it is collected. Each screw 40 is rotated by an individual motor 44, as shown in FIG. 1, although other modes of driving the screws could readily be substituted. The motors 44 are mounted on support brackets 45 secured to the vessel 10. The lower end of each screw 40 is supported in a lower bearing support 46 in the bottom wall 16.

Suction conduits 28 are located in patterns of concentric circles about the center of the vessel, and include portions that extend vertically to draw entrained scrap and liquid from the vessel at different selected distances from the center of the vessel after the scrap has had an opportunity to move to various concentric zones due to the swirling action of the entraining liquid. Because of the different densities of components of this scrap, the different components will be at a different distance from the center of the vessel in a given time and different materials will therefore be withdrawn through the conduits that are at different radial distances from the center. Three sets of conduits 50, 51, 52 are provided in the preferred embodiment and each includes a circular manifold 50a, 51a, 52a and a plurality of vertical collecting tubes 50b, 51b, 52b, depending from their respective manifolds. The circular manifolds are of different diameter, the manifold 50a being the smallest diameter and closely surrounding but spaced from the rotor 24. The manifold 52a is the largest and extends relatively close to the side wall portions 12–15 of the vessel. The intermediate manifold 51a is located between the inner and outer manifolds. All manifolds are secured to a vertically movable support frame 60, formed of two parallel channel beams 61, 62 that extend the full width of the vessel 10 and two cross channels 63, 63 secured to the channel beams. The vertical collecting tubes 50b, 51b, 52b extend downward from the respective circular manifolds at spaced locations and typically extend substantially the full height of the vessel 10. Each vertical tube has a plurality of vertically spaced holes or openings 66 extending the height of the tubes. The frame 60 is suspended from two fluid actuators 68, 69 secured to the superstructure 36 and hence the three sets of conduits 50, 51, 52 are movable vertically by the fluid actuators. Each actuator 68, 69 is of the cylinder and piston type and includes a piston rod 68a, 69a, respectively, that extends downward from the superstructure 36 and is connected to a cross channel 63, 64, respectively, of the frame 60. Actuation of the fluid actuators 68, 69 will raise or lower the frame 60 between an upper position in which the conduits 50, 51, 52 are above the vessel 10 and a lower position as shown in FIGS. 1 and 3, in which the conduits are within the vessel 10. Vertical guides for the frame may be provided on the superstructure if necessary. When the frame 60 is in the lower position it abuts stop members 70 secured to the inside of the vessel 10. Typically, the conduits 50, 51, 52 are raised to a position out of the vessel 10 at the beginning of operation and are lowered into the vessel after liquid in the vessel has been swirled and the entrained scrap has become stratified in radial zones substantially corresponding in location to the location of the three sets of conduits and after the heaviest scrap has migrated to the corners of the vessel. Each of the circular manifolds 50a, 51a, 52a is connected by a flexible conduit 72, 73, 74, respectively, to a suction source in which entraining liquid and entrained waste is collected.

Figure 4:
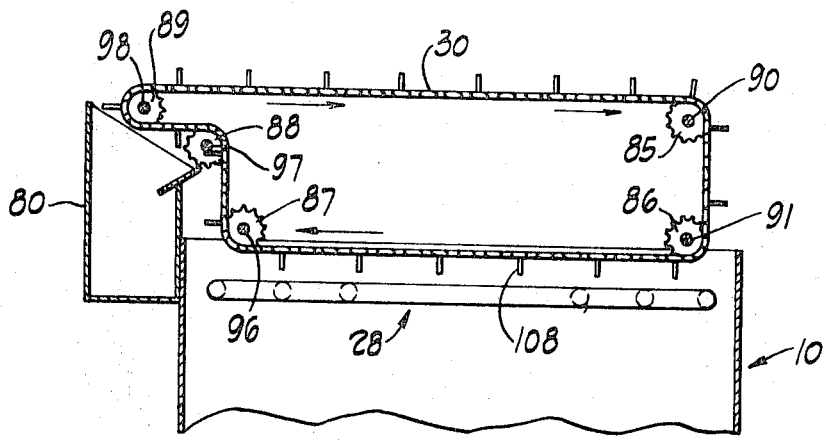
FIG. 4 is a partial transverse sectional view, with parts removed, taken along the line 4—4 of FIG. 2 and looking in the direction of the arrows.

The surface skimmer 30 is a conveyor type apparatus that carries floating scrap components toward the side wall portion 13, lifts the floating scrap components from the vessel 10 and deposits the components in a collecting bin 80. The skimmer is formed of two laterally spaced chain loops 82, 83 that extend across the vessel 10 and which are trained about pairs of spaced sprockets 85, 86, 87, 88 and 89, located as shown in FIG. 4. The pairs of sprockets 85, 86 are supported on shafts 90, 91, respectively, between two plates 92, 93, secured by a vertical channel 94 to the channel beam 62 of the frame 60. The pairs of sprockets 87, 88, 89 are carried by shafts 96, 97, 98, respectively, between two spaced plates 99, 100, which are supported by a vertical channel 101, secured to the channel beam 62. The shaft 90 supporting the pair of sprockets 85 is driven by an electric motor 104 secured to a mounting plate 105 supported by the vertical channel 94. The motor 104 drives the shaft 90 to advance the chain loops 82, 83 in the direction shown by the arrows in FIG. 4. Spaced blades 108 extend between and outward from the chain loops at spaced locations. As shown, the blades are flat, but can be curved slightly in the direction of movement to provide a shallow scoop to aid in collecting and removing floating waste. They extend a sufficient distance outward to dip into the liquid contained in the vessel 10 to skim floating waste components from the surface. The plates 108 carry floating waste components toward the side wall portion 13, and as the chain loops pass around the sprockets 87, the plates 108 rotate 90 degrees into a horizontal position. During this rotation they lift waste components from the surface of the liquid in the vessel and carry the components vertically. As the chain loops pass over the prockets 88, the plates are again rotated 90 degrees back to a depending vertical position to deposit the lifted waste components into the bin 80. Because the skimmer 30 is carried by the support frame 60, it is in an operating position only after the frame has been lowered. If desired, it can be independently supported and can remain at the initial liquid level throughout the operation. This, however requires that it be located at a more peripheral location that will not interfere with the vertical suction conduits. In such a location it will not be effective until the floating waste approaches the perimeter of the vessel. Typically, the skimmer is operated prior to the withdrawal of entraining liquid and waste components through the manifolds 50, 51, 52 because such withdrawal lowers the level of the liquid. It is desirable therefore that it be located to cross the vessel close to the center so that it can be operated early in the cycle and still effectively remove all floating waste.

In operation, liquid for entraining solid waste is introduced to the vessel 10, filling the vessel so that the final level after introduction of waste will be at the level indicated at L in FIG. 3, near the top of the vessel. Solid waste is introduced generally centrally of the vessel through the open top into the liquid. In the primary application of this invention, the waste products will be household scrap. As known in the industry, this includes household waste except for table scrap. Preferably, the household scrap is preground to provide particles that are easy to entrain. Ferro-magnetic materials are typically removed in advance because of the ease in doing so through magnetic separators. The component parts of typical household scrap to be separated by this process will include predominantly glass, plastic, rag, cardboard and paper, and some wood products.

The preferred entraining liquid is water because of its low cost and because it is non-inflammable. Preferably the water will be heated to at least 140 degrees Fahrenheit to improve the rate at which any soluble waste products dissolve, to quickly liquify any grease or other readily liquifiable waste products and to promote the disintegration of paper and cardboard into pulp. The liquification of such products as grease or the like permits such products to be foamed during the swirling of the entraining liquid and the products can be removed as a foam from the surface of the liquid in the vessel. In some instances a presoaking of the waste products can be used to begin breaking down the paper and cardboard into pulp, but typically this is not necessary.

The apparatus disclosed is used in the batch treatment of household scrap, but it will be apparent that the same principles will apply to a continuous treatment by providing a continuous flow of entraining liquid through a vessel, for example, by providing a drain at the bottom of a vessel similar to the vessel 10 and preferably near the center of the vessel.

Depending upon the degree of selectivity desired in segregating various components of scrap, all or only a part of the above-described apparatus may be used in the process. If only heavier particles need be separated from the remaining mass, for example, where it is desired only to separate glass and metals from the remaining scrap, the suction conduits 28 and the skimmer 30 can be omitted o rcan be maintained in a raised position out of the vessel 10. In such an instance the heaviest particles will be collected by the corner collectors 26 and the remaining scrap will be removed with the entraining liquid by merely emptying the vessel after the heavier particles have been segregated. For present purposes, the manner in which a variety of scrap components can be segregated will be described and the manner in which the process can be used for a less complete separation of scrap components will become apparent.

With the suction conduits 28 and the surface skimmer 30 in a raised position out of the vessel 10, but with the entraining liquid and scrap introduced to the vessel, the central rotor 24 is operated to swirl the liquid and thereby entrain the waste. The rotor is driven for a sufficient time to permit the swirling liquid to carry the waste products in a circular path to create a centrifugal force that causes the waste components to gravitate radially outwardly in a direction from the rotor toward the side walls of the vessel. The time of operation of the rotor is selected to allow the heaviest particles to travel to the perimeter of the vessel and insufficient time for the lighter component parts of the waste to reach the perimeter. It will be understood that the distance that any particle travels in response to the centrifugal force acting upon it is time dependent and components of the greatest density will travel the fastest through the rather dense entraining medium. Accordingly, at a given time, the components of the scrap will be distributed radially in substantially concentric zones within the vessel 10, with the heavier particles at the perimeter and the proportionately lighter materials proportionately closer to the center of the vessel. The approximate location of the zones in which particles of scrap will be located at a particular time can be determined with good approximation through calculations based on the relative densities of the particles and the forces applied to the components from the peripheral velocity of the entraining liquid. The locations can also be determined empirically for any particular vessel and rotor rotation through trial and error.

Because of the square shape of the vessel 10, the corners provide four zones in which the liquid moves at a relatively slow velocity. This results in a settling of the entrained particles in the corner portions. Because the particles are relatively dense or heavy, they settle rapidly and are immediately picked up on the surface portions of the screws 40. The screws are driven in rotation in the manner already described to lift the collected heavier particles from the tank and deposit them in chutes from which they are collected.

At the time the waste products have become substantially stratified, with the component parts being located in different concentric zones based on their relative densities, the support frame 60 is lowered to the position shown in FIG. 1 by operation of the fluid actuators 68, 69. In the preferred embodiment, the three circular manifolds 50a, 51a, 52a are each of a diameter and at a respective position to correspond at the time the suction conduits are lowered with the known location of a zone occupied by a component of the scrap in the vessel. In a particular embodiment contemplated, the manifold 52a and depending vertical tubes 52b are located farthest outward from the rotor 24 in a circular zone that will be predominantly occupied by such scrap materials as plastic. The circular manifold 51a and the depending vertical tubes 51b are located somewhat inward of the suction conduit 52, in a circular zone that will be occupied predominantly by waste products such as rag at the predetermined time. The innermost suction conduit 50 is located in an inner zone predominantly occupied by the lightest scrap components, such as paper and cardboard.

At the same time the suction conduits are lowered into the vessel 10, the surface skimmer 30 is lowered to the surface of the liquid in the vessel. Some materials, such as wood particles and foamed waste components such as grease or the like will be floating on the surface of the liquid. Prior to withdrawing waste components and entraining liquid through the suction conduits, the motor 104 that drives the surface skimmer is energized, causing the blades 108 of the surface skimmer to move across the surface from the side wall portion 15 toward the side wall portion 13. By virtue of the location of the surface skimmer as best shown in FIG. 2, it will be apparent that it will intercept any particle on the surface of the liquid that is located outward of the rotor 24 beyond the closest point of the skimmer to the rotor. At the time the skimmer is lowered to the surface, the floating waste will have essentially moved under centrifugal force to a location where it will be intercepted by the blades of the skimmer. The blades carry the floating waste to the wall portion 13, lift it from the vessel and deposit it in the bin 80.

The skimming operation is relatively quick and suction is applied to the circular manifolds 50a, 51a, 52a very shortly after the suction conduits are introduced into the vessel 10. The suction is applied through the conduits 72, 73, 74 and the various segregated components of waste are withdrawn simultaneously through the vertical tubes 50b, 51b, 52b, along with entraining liquid, throughout substantially the entire height of the vessel 10. The number of vertical tubes 50b, 51b, 52b depends upon the size of the vessel 10, but a sufficient number is provided so that waste components are removed at a large number of individual locations throughout an entire circular zone. It is advantageous that the waste components be removed quickly and at a large number of locations throughout each zone because the components continue to travel outward radially of the center of the vessel as long as the liquid continues to swirl. This effect can be diminished by permitting the rotor 24 to idle once the suction conduits have been inserted. The waste components withdrawn through the conduits 72, 73, 74 are introduced to separate tanks (not shown), where the entraining liquid is removed and the waste components separately recovered.

From the above description it will be apparent than an efficient and economic method has been disclosed for separating a variety of components from an otherwise generally homogeneous mass of waste products, especially household scrap, which can be accomplished with reliable and relatively inexpensive equipment. The present invention not only eliminates many of the disadvantages of the current methods of disposing scrap, but permits the recovery and reuse or sale of scrap.

While a preferred method of operation and a preferred embodiment of apparatus for practicing the present invention have been disclosed in detail, it will be understood that various modifications or alterations may be made therein without departing from the spirit and scope of the invention, as set forth in the appended claims.

What is claimed is:

1. A method of separating solid waste of differing densities, including the steps of introducing solid waste of various densities and a liquid for entraining said solid waste into a vessel that has a closed peripheral sidewall with one or more corner portions, swirling the liquid and solid waste within the vessel to entrain the waste in the liquid and to cause portions of the waste to gravitate radially in a direction from the center of the vessel toward the peripheral side wall at different rates depending upon the density of the particular waste portion, collecting a portion of the entrained solid waste in one or more corner portions of the vessel, said collected portion including the heaviest, i.e., most dense portion of said solid waste and excluding substantially lighter, i.e., less dense, portions of said solid waste, and separately removing from the vessel the solid waste collected in the corner portions and solid waste still entrained in the liquid inwardly of the peripheral side wall.

2. The method as set forth in claim 1 wherein said removing of solid waste still entrained in the liquid includes the step of inserting a suction conduit into the liquid at said location radially inward of said peripheral side wall after the liquid has been set into swirling motion and withdrawing liquid and entrained solid waste from the vessel through said conduit.

3. The method as set forth in claim 1 wherein the solid waste includes paper and cardboard, and including the step of at least partially converting paper and cardboard waste into pulp in the vessel during swirling of the liquid.

4. The method as set forth in claim 1 wherein the solid waste is preground and includes paper, cardboard, rag, plastic and glass waste products and wherein glass is collected in a corner portion of the vessel, rag and plastic waste products are collected radially inward of the peripheral side wall, and the paper and cardboard is collected radially inward of the location at which rag and plastic products are collected, whereby different waste products of different density are separately removed from the vessel.

5. The method as set forth in claim 1 wherein solid waste and liquid are introduced as a batch, the liquid and waste is removed from the vessel, and a successive batch is introduced.

6. The method as set forth in claim 1 wherein a portion of the waste material floats on the surface of the liquid in the vessel, including the step of separately removing floating portions of the waste from the vessel.

7. The method as set forth in claim 1 wherein the liquid is water at a temperature of at least 140 degrees Fahrenheit.

8. A method of separating heavier solid waste from lighter solid waste with which it is intermixed, including the steps of entraining the heavier and lighter solid waste in a liquid within a vessel having an upstanding side wall and upstanding corner portions formed in said side wall, swirling said liquid within the vessel at a speed and for a time sufficient to cause the heavier solid waste to move to the side wall of the vessel but insufficient to cause the lighter solid waste to move to the side wall, collecting the heavier solid waste in corner portions of the vessel, and lifting the solid waste collected in corner portions from the vessel.

9. The method as set forth in claim 8 wherein the solid waste is collected at various levels in corner portions of the vessel.

10. The method as set forth in claim 9, including the step of continuously removing the waste collected in corner portions during separation.

11. Apparatus for separating solid waste of substantially different densities, comprising a vessel having a generally vertical side wall and at least one vertically extending corner portion, said vessel adapted to receive solid waste and an entraining liquid, a rotor located generally centrally within the vessel and oriented to swirl liquid within the vessel about a generally vertical axis, means within the vessel at said corner portion to collect relatively dense portions of the solid waste entrained in liquid and caused to swirl within the vessel by said rotor, and means located radially inwardly of the sidewall to collect solid waste of relatively lower density than that collected in said corner portion.

12. The apparatus as set forth in claim 11 wherein the vessel is essentially square in plan.

13. The apparatus as set forth in claim 12 including means within the vessel in each portion, along at least a portion of the height thereof, to collect solid waste.

14. The apparatus as set forth in claim 11 wherein said means at said corner portion extends along the height thereof and conveys collected waste from the vessel.

15. The apparatus as set forth in claim 14 wherein said means located radially inwardly of the sidewall includes a plurality of upright suction conduits movable into and out of the vessel and located in a circular zone radially inward of the side wall, to withdrawn liquid and solid waste.

16. The apparatus as set forth in claim 11 wherein the vessel is closed at the bottom by an upwardly convex bottom wall.

17. The apparatus as set forth in claim 11 including means adjacent an upper portion of the vessel movable across the surface of liquid contained within the vessel for removing floating solid waste.

References Cited

UNITED STATES PATENTS

| | | | |
|---|---|---|---|
| 1,926,546 | 9/1933 | Lampen | 162—55 X |
| 2,294,323 | 8/1942 | Wigton | 209—169 |

FOREIGN PATENTS 791,194  12/1935  France

FRANK W. LUTTER, Primary Examiner

R. J. HILL, Assistant Examiner

U.S. Cl. X.R.

162—4